US010530147B2

(12) United States Patent
Itten et al.

(10) Patent No.: US 10,530,147 B2
(45) Date of Patent: Jan. 7, 2020

(54) CONTROL DEVICE WITH SAFETY SHUTDOWN

(71) Applicant: Schmidhauser AG, Romanshorn (CH)

(72) Inventors: Alex Itten, Romanshorn (CH); Bernhard Laeng, Romanshorn (CH)

(73) Assignee: Schmidhauser AG, Romanshorn (CH)

( * ) Notice: Subject to any disclaimer, the term of this patent is extended or adjusted under 35 U.S.C. 154(b) by 0 days.

(21) Appl. No.: 15/029,193

(22) PCT Filed: Oct. 14, 2014

(86) PCT No.: PCT/EP2014/072030
§ 371 (c)(1),
(2) Date: Apr. 13, 2016

(87) PCT Pub. No.: WO2015/055659
PCT Pub. Date: Apr. 23, 2015

(65) Prior Publication Data
US 2016/0261107 A1    Sep. 8, 2016

(30) Foreign Application Priority Data

Oct. 14, 2013  (DE) .................. 10 2013 220 727

(51) Int. Cl.
*H02P 29/032*  (2016.01)
*H02H 7/08*  (2006.01)
*H02P 27/06*  (2006.01)

(52) U.S. Cl.
CPC .......... *H02H 7/0833* (2013.01); *H02P 27/06* (2013.01)

(58) Field of Classification Search
CPC . H02H 7/0833; H02P 29/0241; H02P 29/032; H02P 27/06
(Continued)

(56) References Cited

U.S. PATENT DOCUMENTS 6,239,566 B1 * 5/2001 Tareilus ............... H02H 7/0833
                                                318/379
7,279,862 B1 * 10/2007 Welchko ............... B60L 3/0061
                                                318/563
(Continued)

FOREIGN PATENT DOCUMENTS

CN    101330251 A    12/2008
CN    102187569 A    9/2011
(Continued)

OTHER PUBLICATIONS

International Search Report (PCT/ISA/210) issued in PCT Application No. PCT/EP2014/072030 dated Jan. 27, 2015 with English translation (seven pages).
(Continued)

*Primary Examiner* — Kawing Chan
(74) *Attorney, Agent, or Firm* — Crowell & Moring LLP

(57) ABSTRACT

A control device for an electrical device such as an electric motor is provided. The control device is designed to, when necessary, bring about a safe, torque-free state of an electric motor, in particular a field-weakened electric motor. The control device includes a safety unit which is designed to generate safety control signals. A driver unit of the control device is designed to generate, irrespective of a state of motor control signals, in the case of a first state pattern of the safety control signals, power semiconductor control signals in such a way that power semiconductors have a non-conductive state, in the case of a second state pattern of the safety control signals to generate the power semiconductor control signals in such a way that a bridge output terminal is electrically connected to a positive intermediate circuit potential, and in the case of a third state pattern of the safety control signals to generate the power semiconductor control signals in such a way that the bridge output terminal is
(Continued)

electrically connected to a negative intermediate circuit potential.

10 Claims, 1 Drawing Sheet

(58) Field of Classification Search
USPC .......................................................... 318/30
See application file for complete search history.

(56) References Cited

U.S. PATENT DOCUMENTS

| | | | |
|---|---|---|---|
| 7,652,858 B2 | 1/2010 | Tang et al. | |
| 8,054,014 B2 | 11/2011 | Rehm et al. | |
| 8,575,879 B2 | 11/2013 | Welchko et al. | |
| 2008/0304189 A1* | 12/2008 | Tang | H02H 7/0838 |
| | | | 361/33 |
| 2010/0202089 A1 | 8/2010 | Kuehner et al. | |
| 2011/0181219 A1* | 7/2011 | Liegeois | H02M 7/49 |
| | | | 318/400.29 |
| 2013/0033908 A1 | 2/2013 | Schwarz et al. | |
| 2013/0114166 A1 | 5/2013 | Schoenknecht et al. | |
| 2013/0187574 A1* | 7/2013 | Sakaguchi | B62D 5/0481 |
| | | | 318/139 |
| 2014/0062368 A1 | 3/2014 | Roessler et al. | |
| 2014/0184117 A1 | 7/2014 | Fernengel et al. | |
| 2014/0191700 A1 | 7/2014 | Eberlein et al. | |
| 2014/0300303 A1* | 10/2014 | Said | H02H 1/0015 |
| | | | 318/400.21 |
| 2015/0054444 A1* | 2/2015 | Tajima | G05B 19/406 |
| | | | 318/565 |
| 2016/0036371 A1* | 2/2016 | Yamasaki | B62D 5/0403 |
| | | | 318/400.22 |

FOREIGN PATENT DOCUMENTS

| | | |
|---|---|---|
| CN | 102612446 A | 7/2012 |
| CN | 103733508 A | 4/2014 |
| DE | 10 2006 003 254 A1 | 7/2007 |
| DE | 10 2006 018 053 A1 | 10/2007 |
| DE | 10 2007 036 027 B4 | 2/2011 |
| DE | 10 2010 003 595 A1 | 10/2011 |
| DE | 10 2011 017 712 A1 | 10/2012 |
| DE | 10 2012 208 631 A1 | 11/2012 |
| DE | 10 2012 002 023 A1 | 12/2012 |
| DE | 10 2011 081 173 A1 | 2/2013 |
| DE | 10 2012 212 247 A1 | 3/2013 |
| EP | 2 341 609 A1 | 7/2011 |
| WO | WO 2011/035970 A2 | 3/2011 |

OTHER PUBLICATIONS

German-language Written Opinion (PCT/ISA/237) issued in PCT Application No. PCT/EP2014/072030 dated Jan. 27, 2015 (eight pages).
Chinese-language Office Action issued in counterpart Chinese Application No. 201480066518.3 dated Jun. 8, 2018 (9 pages).

* cited by examiner

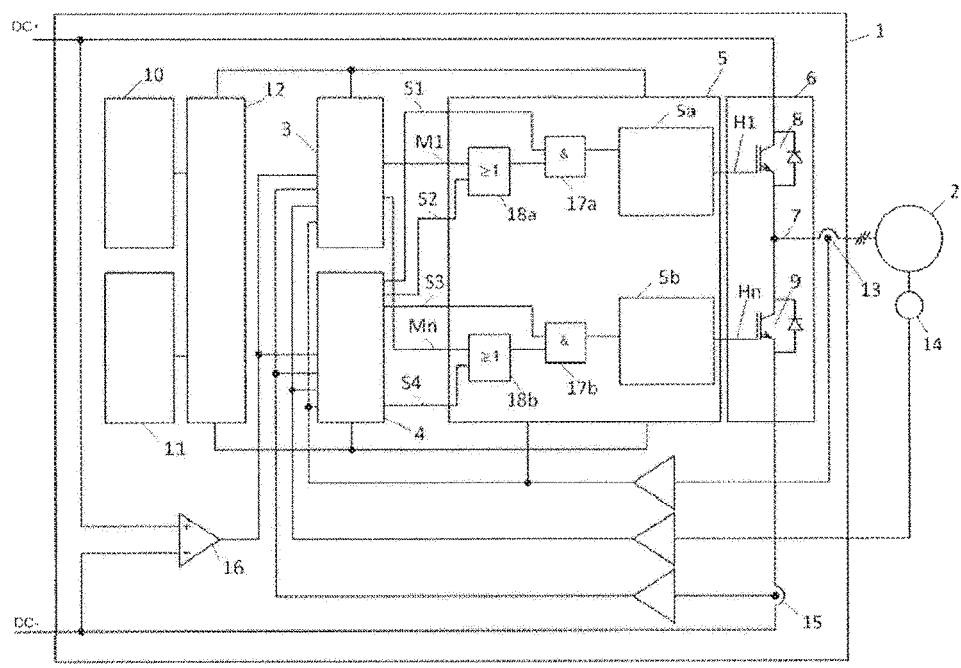

CONTROL DEVICE WITH SAFETY SHUTDOWN

CROSS REFERENCE TO RELATED APPLICATIONS

This application is a National Phase of PCT International Application No. PCT/EP2014/072030, filed Oct. 14, 2014, which claims priority under 35 U.S.C. § 119 from German Patent Application No. 10 2013 220 727.1, filed Oct. 14, 2013, the entire disclosures of which are herein expressly incorporated by reference.

BACKGROUND AND SUMMARY OF THE INVENTION

The invention relates to a control device for an electric machine or an electric motor, in particular a control device in the form of a frequency converter or of a servo-controller.

The invention is based on the object of making available a control device for an electric motor which can, when necessary, bring about a safe, torque-free state of an electric motor, in particular a field-weakened electric motor.

The control device according to the invention, for example in the form of a frequency converter, serves to actuate an electric machine, in particular an electric motor. The electric motor may be, for example, a conventional synchronous machine or an asynchronous machine.

The control device has a motor control unit which is designed to generate a number of motor control signals. The number of motor control signals may be, for example, six or more than six.

The control device also has a safety unit which is independent of the motor control unit and is designed to generate a number of safety control signals. The number of safety control signals may be, for example, four or more than four. The safety unit can be designed to monitor operation of a drive system which contains the control device and the electric motor. For this purpose, a suitable sensor system may be provided. In the case of the safety unit detecting a critical or faulty state, the safety unit generates the safety control signals in such a way that a state which is as safe as possible, in particular a torque-free or torque-reduced state independently of the motor control signals which are generated by the motor control unit.

The control device also has a driver unit which is supplied with the motor control signals and the safety control signals and which is designed to generate power semiconductor control signals for associated power semiconductors of a conventional inverter unit.

The control device also has the inverter unit with a number of bridge branches. The number may be, for example, three. The bridge branches are conventionally supplied with a positive intermediate circuit potential at a first end, and with a negative intermediate circuit potential at a second end. The bridge branches each have a bridge output terminal and each have two or more power semiconductors which are actuated by an associated power semiconductor control signal of the power semiconductor control signals. The power semiconductors may be, for example, IGBTs.

The driver unit is designed to generate, irrespective of a state of the motor control signals in the case of a first state pattern of the safety control signals, the power semiconductor control signals in such a way that all the power semiconductors have a non-conductive state. In other words, all the power semiconductors are switched off, with the result that safe torque enabling occurs.

The driver unit is also designed to generate, irrespective of a state of the motor control signals in the case of a second state pattern of the safety control signals, which is different from the first state pattern, the power semiconductor control signals in such a way that a respective bridge output terminal of all the bridge branches is electrically connected to the positive intermediate circuit potential. The second state pattern or the associated power semiconductor control signals may serve, for example, to safely reduce the torque or enable the torque of a field-weakened machine in the field-weakening range without an intermediate circuit being charged to an excess voltage via associated free-wheeling diodes of the power semiconductors, with the result that, for example, damage to the devices which are coupled to the intermediate circuit can be avoided. At the same time it is ensured that in this state no unacceptably large torque is generated.

The driver unit is also designed to generate, irrespective of a state of the motor control signals in the case of a third state pattern of the safety control signals, which is different from the first or second state pattern, the power semiconductor control signals in such a way that a respective bridge output terminal of all the bridge branches is electrically connected to the negative intermediate circuit potential. This state corresponds functionally to second state pattern.

The driver unit can also be designed, in the case of a fourth state pattern of the safety control signals, to generate the power semiconductor control signals as a function of the motor control signals. The power semiconductor control signals can correspond to the motor control signals here.

Given the presence of the first, second and third state pattern of the safety control signals, the power semiconductor control signals are generated independently of the motor control signals, i.e. the safety control signals or the state patterns thereof overwrites the motor control signals, with the result that a torque-free state can be forcibly brought about, for example by a suitable state pattern of the safety control signals, even if the motor control signals are generated by the motor control unit for generating a torque which is different from zero. The fourth state pattern of the safety control signals can correspond to an enabled state during which the motor control signals determine the generation of the power semiconductor control signals.

The bridge branches can each have more than two power semiconductors which are actuated by an associated power semiconductor control signal of the power semiconductor control signals. For example it is possible to provide four power semiconductors per bridge branch, which power semiconductors are correspondingly assigned four power semiconductor control signals. This permits multi-stage operation of a respective bridge branch.

The control device can have a first voltage supply unit and a second voltage supply unit which is independent of the first voltage supply unit. The first voltage supply unit can be designed to supply the motor control unit and/or the safety unit and/or the driver unit or respective components thereof with an operating voltage. The second voltage supply unit can additionally be designed to supply the motor control unit and/or the safety unit and/or the driver unit or respective components thereof with an operating voltage, with the result that the operating voltage supply is configured in a redundant fashion for safety reasons.

The driver unit can have a first group of functional elements (driver, digital logic, analog circuit etc.) which are designed to generate power semiconductor control signals for those power semiconductors which are connected between the positive intermediate circuit potential and the bridge output terminal, and have a second group of functional elements which are designed to generate power semiconductor control signals for those power semiconductors which are connected between the negative intermediate circuit potential and the bridge output terminal. The first voltage supply unit can be designed to supply the first group and/or the second group with an operating voltage, and the second voltage supply unit can be designed to supply the first group and/or the second group with an operating voltage, with the result that the operating voltage supply is configured in a redundant fashion for safety reasons, and a safe state can be set even when one of the supply voltages fails.

The control device can have a switching unit which is electrically connected on the input side to the first and the second voltage supply units and which is electrically connected on the output side to the motor control unit, the safety unit and the driver unit, wherein the switching unit is designed, in the event of one of the voltage supply units being defective, to output the operating voltage of the non-defective voltage supply unit on the output side and to supply the motor control unit, the safety unit and the driver unit or components thereof with the operating voltage which is output.

The control device can have sensors, for example in the form of rotational speed sensors, current sensors, voltage sensors, temperature sensors etc., which are coupled to the safety unit and which are designed to measure measurement variables in the form of a rotational speed of the electric motor, an intermediate circuit voltage, one or more current measurement signals and/or one or more motor signals. The sensors can additionally also be coupled to the motor control unit. The safety unit can be designed to generate the state patterns of the safety control signals as a function of the measurement variables. The safety unit can be designed to generate the state patterns of the safety control signals additionally or alternatively as a function of a model calculation. By means of the model calculation it is possible, for example, to determine a motor rotational speed indirectly.

The safety unit can be designed to generate the first state pattern of the safety control signals below a threshold rotational speed, and to generate the second or the third state pattern of the safety control signals above the threshold rotational speed.

In a basic rotational speed range below the threshold rotational speed, when necessary the power semiconductors are switched off by the safety unit. Since a peak value of a motor voltage is typically below the intermediate circuit voltage here, a motor current drops and the machine is free of torque.

Instead, above the threshold rotational speed the lower group of the power semiconductors (those power semiconductors which are connected between the negative intermediate circuit potential and the bridge output terminal) or the upper group of the power semiconductors (those power semiconductors which are connected between the positive intermediate circuit potential and the bridge output terminal) is switched on, and therefore the electric motor is short-circuited. Electric motors which can be field-weakened can be dimensioned in such a way that they have a short-circuit current (torque) which is below the rated current (rated torque) of the electric motor. Therefore, this state does not constitute an overload of the power semiconductors.

There is also the possibility of switching on the lower and upper group of the power semiconductors alternately, wherein a switching frequency is preferably kept low, in order to keep corresponding switching losses low.

It is also possible, in the case of one of these two deactivation paths failing, to switch on the respective other group of power semiconductors. The failure (open circuit) can be detected, for example, from the rising of the intermediate circuit voltage.

The safety unit can be designed to determine, as a function of the measurement variables, whether one or more of those power semiconductors which electrically connect the bridge output terminal to the positive or negative intermediate circuit potential are defective, for example cannot be switched on (made conductive) or cannot be switched off (made non-conductive). For this purpose, for example, current sensors can be provided at a suitable location in the bridge branch, which current sensors permit the safety unit to compare an actual current with a current which is to be expected according to a switched state of the power semiconductors.

The safety unit can be designed to determine, as a function of the measurement variables, whether one or more of those power semiconductors which electrically connect the bridge output terminal to the positive intermediate circuit potential cannot be switched on (made conductive), wherein if this is the case the first or the third state pattern of the safety control signals is generated.

The safety unit can also be designed to determine, as a function of the measurement variables, whether one or more of those power semiconductors which electrically connect the bridge output terminal to the positive intermediate circuit potential cannot be switched off (made non-conductive), wherein if this is the case the first or the second state pattern of the safety control signals is generated.

The safety unit can also be designed to determine, as a function of the measurement variables, whether one or more of those power semiconductors which electrically connect the bridge output terminal to the negative intermediate circuit potential cannot be switched on, wherein if this is the case the first or the second state pattern of the safety control signals is generated.

The safety unit can also be designed to determine, as a function of the measurement variables, whether one or more of those power semiconductors which electrically connect the bridge output terminal to the negative intermediate circuit potential cannot be switched off, wherein if this is the case the first or the third state pattern of the safety control signals is generated.

The safety unit can be designed to determine, as a function of the measurement variables, whether a short circuit is present within one or more bridge branches, wherein if this is the case an associated state pattern of the safety control signals is generated.

The safety unit can be designed to generate, in particular on the basis of the first state pattern of the safety control signals, the second or third state pattern of the safety control signals if the intermediate circuit voltage exceeds a threshold value, in order in this way to prevent a further rise in the intermediate circuit voltage.

The safety unit can be designed, in the case of the safety control signals being generated with the second or third state pattern, to generate a state pattern which is different from the second or third state pattern if a measurement variable in the form of a motor current exceeds a threshold value, in order to reduce the motor current.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 shows a block diagram of a control device according to an embodiment of the invention.

DETAILED DESCRIPTION

FIG. 1 shows a control device 1 in the form of a frequency converter which serves to actuate a conventional electric motor or a conventional electric machine 2.

The control device 1 has a motor control unit 3 which generates binary motor control signals M1 to Mn (only two motor control signals are illustrated by way of example). In addition, a safety unit 4 is provided which generates binary safety control signals S1 to S4.

A driver unit 5 receives the motor control signals M1 to Mn and the safety control signals S1 to S4 and generates power semiconductor control signals H1 to Hn as a function of these signals (only two power semiconductor control signals are illustrated by way of example). For this purpose, the driver unit 5 has OR gates 18a and 18b, AND gates 17a and 17b and gate drivers 5a and 5b. The elements 5a, 17a, 18a (which are indexed by the "a" label) form a first group of functional elements which are designed to generate power semiconductor control signals H1 for those power semiconductors 8 which are connected between the positive intermediate circuit potential DC+ and the bridge output terminal 7. The elements 5b, 17b, 18b (which are indexed by the "b" label) form a second group of functional elements which are designed to generate power semiconductor control signals H2 for those power semiconductors 9 which are connected between the negative intermediate circuit potential DC− and the bridge output terminal 7.

An inverter unit 6 of the control device 1 has a number of bridge branches. In FIG. 1, an individual bridge branch with power semiconductors 8 and 9 in the form of IGBTs, each with associated free-wheeling diodes which are actuated by an associated one of the power semiconductor control signals H1 or Hn is illustrated by way of example. Further, in particular two further, bridge branches may also be provided which are constructed and actuated in a corresponding fashion. Precisely one bridge branch is preferably provided per phase of the electric motor 2, with the result that three bridge branches are provided for a three-phase electric motor.

The bridge branches or illustrated bridge branch are/is supplied with a positive intermediate circuit potential DC+ at a first end, and with a negative intermediate circuit potential DC− at a second end.

The bridge branches or the illustrated bridge branch have/has in each case a bridge output terminal 7 which is coupled to an associated motor phase of the electric motor 2.

As long as the safety control signals S1 to S4 have a first binary state pattern "0X0X" (X corresponds to don't care), the driver unit 5 generates the power semiconductor control signals H1 to Hn in such a way that all the power semiconductors 8, 9 have a non-conductive state. The same applies to further bridge branches which may be present. The first binary state pattern is usually generated below a threshold rotational speed of the electric motor 2 if, for example, safety deactivation is necessary. The first state pattern is also referred to as the STO state below.

As long as the safety control signals S1 to S4 have a second binary state pattern "110X", the driver unit 5 generates the power semiconductor control signals H1 to Hn in such a way that exclusively the power semiconductor 8 is conductive, and therefore the bridge output terminal 7 is electrically connected to the positive intermediate circuit potential DC+. The same applies to further bridge branches which may be present.

As long as the safety control signals S1 to S4 have a third binary state pattern "0X11", the driver unit 5 generates the power semiconductor control signals H1 to Hn in such a way that exclusively the power semiconductor 9 is conductive, and therefore the bridge output terminal 7 is electrically connected to the negative intermediate circuit potential DC−. The same applies to further bridge branches which may be present.

The second and third binary state patterns are usually generated above a threshold rotational speed of the electric motor 2 if, for example, the safety deactivation is necessary. The second and third state patterns are also referred to below as the upper and lower SSC states, respectively.

As long as the first safety control signals S1 to S4 have a fourth binary state pattern "1010", the driver unit 5 generates the power semiconductor control signals H1 to Hn in such a way that the power semiconductor control signals H1 to Hn correspond to the motor control signals M1 to Mn. The same applies to further bridge branches which may be present. The fourth binary state pattern is usually generated when no safety deactivation is necessary, with the result that the motor control unit 3 controls the operation of the electric motor 2.

The control device 1 has a first voltage supply unit 10 and a second voltage supply unit 11 which is independent of the first voltage supply unit 10.

The control device 1 also has a switching unit 12 which is electrically connected on the input side to the first and second voltage supply units 10, 11 and which is electrically connected on the output side to the motor control unit 3, the safety unit 4 and the driver unit 5. The switching unit 12 is provided, in the event of one of the voltage supply units 10, 11 being defective, to output the operating voltage of the non-defective voltage supply unit on the output side and to supply the motor control unit 3, the safety unit 4 and the driver unit 5 with the operating voltage which is output.

The control device has sensors 13, 14, 15, 16 which are coupled to the motor control unit 3 and the safety unit 4 and which are designed to measure measurement variables in the form of a rotational speed of the electric motor, an intermediate circuit voltage, one or more current measurement signals and/or one or more motor signals. The driver unit 5 can optionally also be supplied with the measurement variables or some of the measurement variables, wherein in this case the driver unit 5 can be designed to generate the power semiconductor control signals H1 to Hn also as a function of the measurement variables.

By means of the current sensor 15 it is, for example, possible to determine whether a power semiconductor 8, 9 cannot be switched off and/or whether a motor current exceeds a threshold value.

The motor control unit 3 and the safety unit 4 are each designed to generate the motor control signals M1 to Mn or the state pattern of the safety control signals S1 to S4 as a function of the measurement variables.

The invention permits cost-effective and safe torque enabling of a field-weakened electric machine 2.

In a basic rotational speed range, all the power semiconductors 9, 9 of the bridge branches are switched off by the first state pattern. Since the peak value of the motor voltage is below the intermediate circuit voltage, the motor current drops and the electric machine 2 is torque-free.

In contrast, in the field-weakening range, safety deactivation takes place by the second or third state pattern, as a result of which the lower group or the upper group of the power semiconductors 8 and 9, respectively, is switched on and therefore the e-machine 2 is short-circuited without the intermediate circuit being charged via the free-wheeling diodes and the control device 1 or connected devices being destroyed as a result of excess voltage, and without an unacceptably large torque being generated in this state.

There is the possibility of alternately switching the lower and upper power semiconductor group 8 and 9, respectively, wherein the switching frequency is kept low in order to keep the switching losses low.

It is also possible, in the event of one of these two deactivation paths failing, to switch on the respective other group of power semiconductors. The failure (open circuit) can be detected, for example, from the rise in the intermediate circuit voltage.

Owing to the available high-performance hardware (for example high-speed DSPs or programmable logic) for the motor control unit 3 and the safety unit 4 it is possible to achieve a very large control bandwidth (current controller with 8 kHz for example), as a result of which the control device 1 is capable of setting the correct safety deactivation measure or state pattern even when the rotational speed at the electric machine 2 has changed very quickly (blocked wheel, for example as a result of ABS).

The safety unit 4 and/or the driver unit 5 can be designed in such a way that the safety unit 4 and/or the driver unit 5 protects/protect the power semiconductors 8, 9 against overloading in such a way that they themselves can take over the function of switching off or short-circuiting the e-machine 2, even under overload conditions, without the motor control unit 3 engaging.

It is possible to provide that when the second or third state pattern (SSC state) is active in the case of an excessively large resulting motor current the safety unit 4 and/or the driver unit 5 do/does not switch off the power semiconductors 8, 9 continuously and therefore end/ends the SSC state but instead do/does this only for a remaining PWM period (this is to say, for example, a maximum of 250 µs) of a conventional PWM actuation method. Before switching on again it is possible to check whether this is permissible.

Before switching on again it is possible to check which of the two semiconductor groups 8, 9 can assume the SSC function if, for example, one of the two feeds has failed or a defect has been detected at the other semiconductor group (for example as a result of a rise in voltage in the intermediate circuit).

Owing to the redundant voltage supply with two sources 10 and 11 (for example 12 V or 24 V on-board power system and the intermediate circuit), the safe state STO or SSC can always be set even in the event of failure of one of the two sources 10 and 11, respectively, and therefore the e-machine 2 can be switched to a torque-free state even in the event of a failure of the sensor system.

The safe state STO or SSC which is to be set can be determined, for example, by evaluating resolver signals, evaluating current signals and the stator frequency (rotational speed for synchronous machines) that can be determined therefrom, evaluating the intermediate circuit voltage (switching from STO to SSC if the latter rises above a certain value or has an excessively high rate of increase) and/or by measuring the motor voltage.

The motor rotational speed does not have to be determined precisely for the correct selection of the safe state STO or SSC. As a result of the fact that the intermediate circuit voltage range is generally specified in a broad fashion, it is not necessary to detect a precise switching point. As soon as the rotational speed has dropped below the limit of the maximum intermediate circuit voltage and therefore the free-wheeling diodes no longer conduct, STO is the safe measure because the torque can therefore be set to zero independently of the rotational speed.

When the invention is used in a motor vehicle, it is possible to make a decision about the safe state on the basis of the measurement variables last stored, since the change in the speed of a vehicle generally takes place only very slowly. If the STO state is selected, this is valid until the rotational speed 0 is reached, that is to say the stationary state of the vehicle. If the SSC state is selected this state can be retained, even if the torque rises just before the rotational speed 0 is reached and the vehicle then brakes quickly at a safe, low speed.

As a result of the measurement of the motor current (calculation of the frequency or as a result of the measurement of the distance of the zero crossings) or by a rotational speed sensor it is also possible to switch over to the safe state STO starting from the point when a predefined rotational speed is undershot.

Switching over from STO to SSC in order to ensure the safe state could be based, in the simplest case, exclusively on the evaluation of a limiting value of the intermediate circuit voltage which is carried out independently of other supply voltages which have potentially failed.

Both the motor control unit 3 and the safety unit 4 are each independently capable of switching on the safe state STO or SSC, respectively. Nevertheless, the two units differ in that the motor control unit 3 can set all the switched states, that is to say even desired driving states such as acceleration, while the safety unit 4 can exclusively set a safe state STO, upper SSC and lower SSC.

Through suitable programming of the safety unit 4 and/or through additional hardware linking it is possible to ensure that the safety unit 4 can only set the 3 safe states STO, upper SSC and lower SSC. The safety unit 4 has the priority in the actuation of the power semiconductors 8, 9 and can therefore overwrite a torque-generating state of the motor control unit 3 with a safe state, but not vice versa.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A control device for an electric motor, comprising:
 a motor control unit configured to generate motor control signals;
 a safety unit configured to generate safety control signals;
 a driver unit configured to receive the motor control signals and the safety control signals and, based on evaluation of both the motor control signals and the safety control signals together, to generate power semiconductor control signals;
 an inverter unit having
  a plurality of bridge branches configured to supply voltage to the electric motor in response to the power semiconductor control signals generated by the driver unit, each of the plurality of bridge branches being connected at a first end to a positive intermediate circuit potential, at a second end to a negative intermediate circuit potential, and to a bridge output terminal, and for each of the plurality of bridge branches, at least two power semiconductors configured to be actuated by associated ones of the power semiconductor control signals;

a switching unit configured to control supply of voltage to the motor control unit and the safety unit;

a first voltage supply unit configured to supply voltage to the switching unit;

a second voltage supply unit configured to supply voltage to the switching unit and being independent of the first voltage supply unit; and wherein the first voltage supply unit and the second voltage supply unit to the switching unit are separate from the supply of voltage to the electric motor, the switching unit is configured such that in the event of the first voltage supply unit being in a failed state, the switching unit outputs an operating voltage of the second voltage supply unit to the motor control unit, the safety unit and the driver unit, and in the event of the second voltage supply unit being in a failed state, the switching unit outputs an operating voltage of the first voltage supply unit to the motor control unit, the safety unit and the driver unit, the driver unit is configured to generate, irrespective of a state of the motor control signals, the safety control signals in a manner such that in a first state pattern of the safety control signals, all of the power semiconductors are in a non-conductive state, in a second state pattern of the safety control signals, the bridge output terminal is electrically connected to the positive intermediate circuit potential, and in a third state pattern of the safety control signals, the bridge output terminal is electrically connected to the negative intermediate circuit potential.

2. The control device as claimed in claim 1, wherein
in a fourth state pattern of the safety control signals, the driver unit is configured to generate the power semiconductor control signals as a function of the motor control signals.

3. The control device as claimed in claim 2, wherein
the driver unit includes
a first group of functional elements configured to generate the associated ones of the power semiconductor control signals for the power semiconductors connected between the positive intermediate circuit potential and the bridge output terminal, and
a second group of functional elements configured to generate the associated ones of the power semiconductor control signals for the power semiconductors connected between the negative intermediate circuit potential and the bridge output terminal,
the first voltage supply unit is configured to supply at least one of the first group of functional elements and the second group of functional elements with a first operating voltage, and
the second voltage supply unit configured to supply at least one of the first group and the second group with a second operating voltage.

4. The control device as claimed in claim 3, wherein
at least one sensor coupled to the safety unit configured to measure at least one measurement variable, the at least one measurement variable including at least one of a rotational speed of the electric motor, an intermediate circuit voltage, at least one current measurement signal, and at least one motor signal, and
the safety unit is configured to generate one of the first, second, third or fourth state patterns of the safety control signals as a function of the at least one measurement variable.

5. The control device as claimed in claim 4, wherein
the safety unit is configured to generate the first state pattern of the safety control signals when the rotational speed of the electric motor is below a threshold rotational speed, and to generate the second or the third state pattern of the safety control signals when the rotational speed of the electric motor is above the threshold rotational speed.

6. The control device as claimed in claim 4, wherein
the safety unit is configured to at least one of determine as a function of the at least one measurement variable,
whether one or more of the power semiconductors electrically connecting the positive intermediate circuit potential to the bridge output terminal cannot be switched on, and if determined to not be able to be switched on, generating the first or the third state pattern of the safety control signals,
whether one or more of those power semiconductors electrically connecting the positive intermediate circuit potential to the bridge output terminal cannot be switched off, and if determined to no be able to be switched off, generating the first or the second state pattern of the safety control signals,
whether one or more of those power semiconductors electrically connecting the negative intermediate circuit potential to the bridge output terminal cannot be switched on, and if determined to not be able to be switched on, generating the first or the second state pattern of the safety control signals, and
whether one or more of those power semiconductors electrically connecting the negative intermediate circuit potential to the bridge output terminal cannot be switched off, and if determined to no be able to be switched off, generating the first or the third state pattern of the safety control signals.

7. The control device as claimed in claim 6, wherein
the safety unit is configured to determine as a function of the at least one measurement variable whether a short circuit is present within one or more of the plurality of bridge branches, and if the short circuit is present, generating the first, second or third state pattern of the safety control signals.

8. The control device as claimed in claim 7, wherein
the safety unit is configured to generate based on the first state pattern of the safety control signals or the second or third state pattern of the safety control signals if the intermediate circuit voltage exceeds a threshold value.

9. The control device as claimed in claim 8, wherein
after the second or third state pattern the safety control signals has been generated, the safety unit is configured to generate a state pattern different from the previously-generated second or third state pattern if a motor current exceeds a threshold value.

10. The control device as claimed in claim 1, wherein each of the at least two power semiconductors associated with each of the plurality of bridge branches includes more than two power semiconductors.

\* \* \* \* \*